(12) United States Patent
Azemi et al.

(10) Patent No.: US 11,747,902 B2
(45) Date of Patent: Sep. 5, 2023

(54) MACHINE LEARNING CONFIGURATIONS MODELED USING CONTEXTUAL CATEGORICAL LABELS FOR BIOSIGNALS

(71) Applicant: Apple Inc., Cupertino, CA (US)

(72) Inventors: Erdrin Azemi, Sunnyvale, CA (US); Joseph Yitan Cheng, Santa Clara, CA (US); Hanlin Goh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 17/174,875

(22) Filed: Feb. 12, 2021

(65) Prior Publication Data

US 2021/0286429 A1 Sep. 16, 2021

Related U.S. Application Data

(60) Provisional application No. 62/988,040, filed on Mar. 11, 2020.

(51) Int. Cl.
*G06F 3/01* (2006.01)
*G06N 3/04* (2023.01)
*G06N 20/00* (2019.01)

(52) U.S. Cl.
CPC ............... *G06F 3/015* (2013.01); *G06N 3/04* (2013.01); *G06N 20/00* (2019.01)

(58) Field of Classification Search
None
See application file for complete search history.

(56) References Cited

U.S. PATENT DOCUMENTS

| | | |
|---|---|---|
| 9,798,751 B2 | 10/2017 | Birdwell et al. |
| 9,875,440 B1 | 1/2018 | Commons |
| 10,009,644 B2 | 6/2018 | Aimone et al. |
| 10,452,989 B2 | 10/2019 | Majumdar |
| 2011/0030709 A1 | 12/2011 | Oweiss et al. |
| 2011/0307079 A1 | 12/2011 | Oweiss et al. |
| 2014/0236953 A1 | 8/2014 | Rapaport et al. |
| 2015/0351655 A1 | 12/2015 | Coleman |
| 2016/0242690 A1 | 8/2016 | Principe et al. |
| 2019/0113973 A1 | 4/2019 | Coleman et al. |

(Continued)

FOREIGN PATENT DOCUMENTS

| | | |
|---|---|---|
| EP | 2 895 970 B1 | 7/2018 |
| JP | 2018513398 A | 5/2018 |
| KR | 20020041804 A | 6/2002 |

(Continued)

*Primary Examiner* — Nicholas J Lee
(74) *Attorney, Agent, or Firm* — Kilpatrick Townsend & Stockton LLP

(57) ABSTRACT

Techniques are disclosed for defining a training data set to include biosignals and categorical labels representative of a context. For example, a categorical label may indicate whether a user was performing a difficult or easy mental task while the biosignal was being recorded. A set of first layers in a neural network can be trained using a portion of the training data set associated with a first set of users and at least one second layer can be trained using a portion of the training data set associated with a particular other user. The neural network can then be used to process other biosignals from the particular other user to generate predicted categorical context labels.

21 Claims, 8 Drawing Sheets

(56) References Cited

U.S. PATENT DOCUMENTS

2020/0401933 A1* 12/2020 Reinen .................. G16C 60/00
2022/0057865 A1* 2/2022 Ballagas ................ G06F 3/015

FOREIGN PATENT DOCUMENTS

| KR | 20020096033 A | 12/2002 |
| KR | 20040038609 A | 5/2004 |
| KR | 20040038610 A | 5/2004 |
| WO | 2014/107795 A1 | 7/2014 |
| WO | 2014/138925 A1 | 9/2014 |
| WO | 2014/205231 A1 | 12/2014 |
| WO | 2014/040175 A1 | 3/2015 |

* cited by examiner

MACHINE LEARNING CONFIGURATIONS MODELED USING CONTEXTUAL CATEGORICAL LABELS FOR BIOSIGNALS

CROSS-REFERENCES TO RELATED APPLICATIONS

The present application claims the benefit of and priority to U.S. Provisional Application No. 62/988,040 filed Mar. 11, 2020, entitled "MACHINE LEARNING CONFIGURATIONS MODELED USING CONTEXTUAL CATEGORICAL LABELS FOR BIOSIGNALS." This application is hereby incorporated by reference in its entirety for all purposes.

BACKGROUND

Biosignals are signals that can be measured from biological beings. Some biosignals can be processed using particular techniques to generate an interpretable output. For example, an electrocardiogram (ECG) can be processed to detect signatures of individual QRS complexes (e.g., threshold crossings), and instantaneous and numeric heart rates can be determined based on intervals between the QRS complexes.

Other types of information conveyed in other types of biosignals can be more difficult to extract. For example, electroencephalography (EEG) is a non-invasive technique for recording neural signals. The power in particular frequency bands of electrical brain activity recorded using EEG can be modulated by attentional changes. However, it is generally not possible to process EEG signals to generate instantaneous and numeric attention metrics. Challenges in this regard include difficulty in objectively quantifying levels of mental states such as attention, a high degree of user variability of EEG signals, and a high degree of variability across EEG recordings from even a single user in a same circumstance. Further, the signals are considered to be highly non-linear, non-stationary and noisy.

These challenges are also relevant for biosignals measured using functional near-infrared spectroscopy (fNIRS). fNIRS is another non-invasive technique (that can be used while also collecting EEG signals) for monitoring neural signals. Specifically, fNIRS emits and measures near-infrared light signals. While skin, tissue and bone are primarily transparent to near-infrared light, hemoglobin and deoxygenated hemoglobin absorb this wavelength of light. Thus, the recorded light signals can indicate, for particular brain regions, a blood volume, flow and oxygenation level. fNIRS signals, like EEG signals, can also be modulated by attentional states, though it similarly is not possible to use fNIRS signals to generate instantaneous and numeric attention measures.

It would be advantageous to identify a new approach for analyzing biosignals that can more reliably characterize characteristics of a context, including a mental state of a user.

SUMMARY

In some embodiments, a computer-implemented method is provided. A particular biosignal corresponding to a particular subject can be accessed. The particular biosignal can be processed using a machine learning model to generate a particular categorical output. The machine learning model may have been trained at least in part to predict comparative results indicating which of multiple data elements is associated with a higher amount of a particular contextual characteristic. The machine learning model may have been trained using a set of training data elements. Each training data element of the set of training data elements may have included a biosignal and a contextual category label characterizing a context associated with recording of the biosignal. The contextual category label may have identified a contextual category of a set of predefined contextual categories. The set of predefined contextual categories can include the particular categorical output. A device operation can be selected based on the particular categorical output. The selected device operation can be triggered to be performed at a user device.

Some embodiments of the present disclosure include a system including one or more data processors. The system can include a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer program product tangibly embodied in a non-transitory machine-readable storage medium, including instructions configured to cause one or more data processors to perform part or all of one or more methods and/or part or all of one or more processes disclosed herein.

The following detailed description together with the accompanying drawings will provide a better understanding of the nature and advantages of the present invention.

Figure 1:
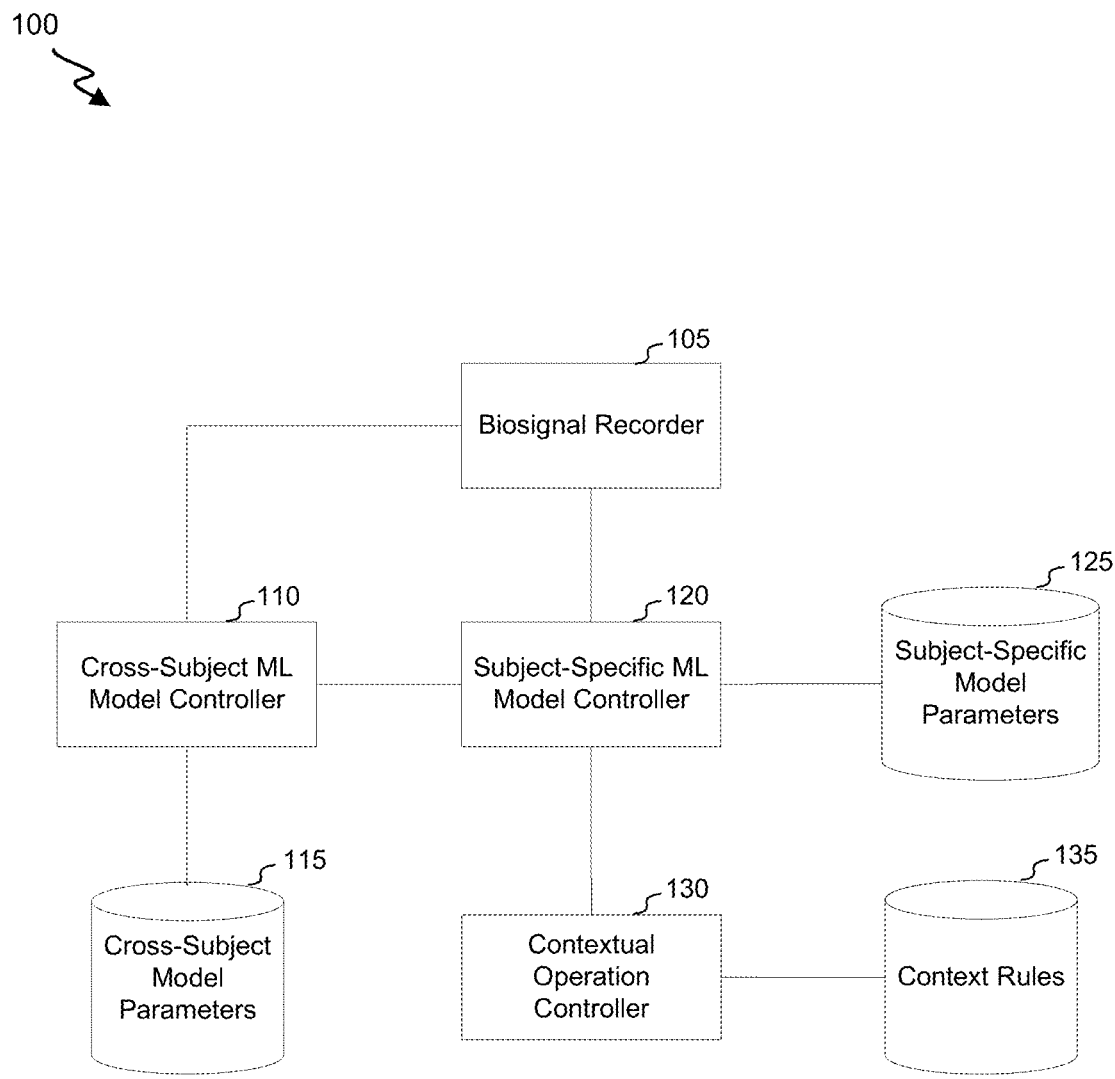
FIG. 1 shows components of an exemplary machine learning interaction system for collecting and processing biosignals according to some embodiments of the invention.

In the appended figures, similar components and/or features can have the same reference label. Further, various components of the same type can be distinguished by following the reference label by a dash and a second reference label that distinguishes among the similar components. If only the first reference label is used in the specification, the description is applicable to any one of the similar components having the same first reference label irrespective of the second reference label.

DETAILED DESCRIPTION

Techniques are disclosed for processing biosignals using a machine learning (ML) model trained using strategic training data. The machine learning model can be trained to predict which, of multiple biosignals, were associated with a higher value of a particular contextual characteristic. Contextual categories can be defined to correspond to various absolute or relative values of the particular contextual characteristic. In some instances, a first contextual category is defined to correspond to a relatively high value for the particular contextual characteristic, and a second contextual category is defined to correspond to a relatively low value for the particular contextual characteristic. The particular contextual characteristic (and thus each contextual category) may indicate what a subject in a preceding time period or currently, how sensors are positioned on a subject, what kind of sensors are being used, a current temperature, a background noise level. For example, an output of the neural network may correspond to a prediction that a given biosignal was recorded while a subject was exhibiting a higher mental workload (e.g., a first contextual category) as compared to a context associated with a baseline signal (e.g., a second contextual category). Training data that includes biosignals and label data indicating known contextual categories may be collected using (for example) device data that identifies current device operations (e.g., what app was in view, how an app was being used, a type of input being received and/or a type of output stimulus being output). A machine learning model trained using the training data can then be used to predict a contextual category based on a biosignal.

The machine learning model can be configured to include a first sub-model (e.g., including a neural network and/or first set of layers) that receives an individual biosignal and that outputs an interim numeric (e.g., real-number) value. A difference metric can be generated by comparing (e.g., subtracting) the interim numeric value to another interim numeric value associated with one or more other biosignals. The difference metric can be fed to another sub-model (e.g., including another neural network and/or at least one second layer) to predict a comparison based on the biosignals (e.g., whether they are associated with a same or similar context with respect to the particular contextual characteristic, whether one of the biosignals was associated with a context having a higher value for the particular contextual characteristic, etc.). To configure the machine learning model to generate this type of output, training may include evaluating pairs of labeled biosignals (which may, but need not, include a baseline biosignal associated with a specific contextual-characteristic value). When using the trained machine learning model, the comparative analysis may be performed using at least one baseline biosignal to predict whether and/or to what degree a contextual-characteristic value for another non-baseline biosignal corresponds to a contextual-characteristic value associated with baseline biosignal(s).

In some instances, the training data can include a first set of training elements associated with a group of subjects and a second set of training elements associated with a particular subject for which the network is being trained. The first sub-model can be trained using the first set of training elements, and the at least one second layer can be trained using the second set of training elements. The first sub-model can include (for example) a deep feedforward neural network that includes one or more convolutional layers to perform a time-frequency analysis and compression of multi-channel data streams. The first sub-model can be configured to output a numeric output (e.g., a real-value numeric output along a bounded or unbounded scale), and the second sub-model can be configured to transform the numeric output to a categorical output that predicts a context during which a given input biosignal was collected.

Each training element in the training data can include a biosignal and a label that is indicative of a context during which the biosignal was collected. For example, the label can indicate which mental or physical task was being performed by a subject, a subject-identified satisfaction with content being presented, a subject-identified level of alertness, a subject-identified mood, etc. The label can be or can represent a rank category instead of a particular class. For example, a first label may indicate that a task being performed was harder than a task associated with a second label. As another example, three labels ("1", "2" and "3") may be defined to indicate how satisfied a subject was with a song being played, such that it can be inferred that a subject preferred a song associated with a subject-identified "3" label more than a song associated with a subject-identified "1" label. Using relative ranking labels can be advantageous in that it can reduce labeling noise. For example, configuring training to attempt to learn particular absolute contextual values may be particularly difficult when an output is subjective or depends on individual capabilities.

Configuring a machine learning model to generate a relative rank-based label can retain various practical applications. For example, a device may be operated to provide a notification conveying a recommendation (e.g., to take a break, perform a stretch) when an output predicts that a subject is relatively more stressed, more tired or less attentive as compared to other instances. As another example, a device may determine to change a presentation (e.g., to change a sound being played) when an output predicts that a subject is relatively less satisfied with the stimulus being presented.

FIG. 1 shows components of an exemplary machine learning interaction system 100 for collecting and processing biosignals according to some embodiments of the invention. A biosignal recorder 105 can be configured to collect biosignals from a user. A biosignal can include (for example) electroencephalogram (EEG) signals, a functional near-infrared spectroscopy (fNIRS) signals, or an electrocardiogram (ECG). Biosignal recorder 105 can include one or more electrodes. In some instances, biosignal recorder 105 pre-processes recorded signals. For example, a filter can be used to remove or reduce signal components from particular noise-associated frequency band and/or a signal may be down-sampled or up-sampled to produce a signal having a particular target sampling frequency. Biosignal recorder 105 may be integrated into a user device, may be a stand-alone system or may be an accessory that can connect with an electronic (e.g., user) device (e.g., via a wired or wireless connection)

A cross-subject machine learning model controller 110 (configured to control a ML model trained using data associated with multiple subjects) can receive a first set of biosignals (e.g., from a set of user devices each including or being connected with a biosignal recorder 105) that are associated with a first set of subjects. Cross-subject ML model controller 110 can further receive metadata that indicates, for each of the first set of biosignals, a characteristic of a context (pertaining to a subject from whom the biosignal was recorded) during which the recording was obtained. For example, the characteristic may identify a particular mental or physical task being performed by the subject; a particular intellectual or physical activity being performed by the subject; a subject-reported mood; a subject-reported alertness; a subject-reported satisfaction (e.g., with an audio or visual stimulus being presented to the subject); a result (e.g., an accuracy result) of a task being performed by the subject; etc.

Cross-subject ML model controller 110 can use the metadata to assign a label to each of the first set of biosignals. The label can be a contextual-category label and represent a characteristic of the context in which the biosignal was recorded. The label may be selected from among a pre-defined set of labels, and the set of labels can correspond to a predefined set of contextual categories. The set of labels (and the predefined set of contextual categories) can correspond to rankings and/or relative assessments. For example, a first label of a set of labels can correspond to a (e.g., particular) relatively hard task, and a second label can correspond to a (e.g., particular) relatively easy task.

Cross-subject ML model controller 110 can use the first set of biosignals and corresponding labels to train at least part of a machine learning model (e.g., a first sub-model of a higher level machine learning model). The training can include pair-wise data that corresponds to different labels. For example, each pair can include one biosignal associated with a "positive review" contextual label (e.g., relating to a review of a song being played) and one biosignal associated with a "negative review" contextual label. Each biosignal can be processed by the cross-subject ML model to generate an interim score, and a difference of the scores can be assessed to predict which of the two signals was associated with a higher review.

At least part of the machine learning model can include a first set of layers, which can include one or more convolutional layers. The convolutional layers can (e.g., individually and/or collectively) be configured to reduce a dimensionality of a signal with regard to a time dimension and/or channel dimension. For example, a single input signal may include values associated with each of multiple time points and each of multiple channels, though an output of the first set of layers may lack these dimensions. At least part of the machine learning model can be configured to receive as input a biosignal and to generate an interim result that includes a numeric value along a bounded or unbounded continuum. For example, the interim result can be a real number between 0 and 1 or between −100 and 100. Training the first set of layers can result in learning a set of ML model parameters, which can be stored in a cross-subject model parameters data store 115.

In addition to the first set of layers, the machine learning model can further include at least one subject-specific layer that is trained (by a subject-specific ML model controller 120) using training data corresponding to a single particular subject. In some instances, the at least one subject-specific layer can implement (for example) an activation function, step function, sigmoid function, softmax function, rectified linear unit (ReLU) function or other non-linear function. In some instances, the at least one subject-specific layer includes a feedforward neural network. The at least one subject-specific layer can be configured to receive, at input, an interim result generated based on an output from the first set of layers and to generate a categorical output (e.g., corresponding to one of a set of labels and/or one of a set of contextual categories represented in the training data). For example, the interim result can include a difference between two outputs corresponding to two biosignals or can include an output corresponding to a single biosignal.

The categorical output can (for example) include a binary output. The categorical output can predict which one or two or more contexts a subject was in when a biosignal was recorded (e.g., with the two or more contexts being at least partly, primarily or entirely distinguishable based on a particular characterizing variable). Training at least one subject-specific layer can include (for example) learning one or more subject-specific parameters, such as a threshold, inflection point, amplitude, offset and/or other variable. The learned subject-specific parameter(s) can be stored in a subject-specific model parameter data store 125 (e.g., potentially in association with an identifier of the single particular subject). In some instances, the first set of layers and the at least one subject-specific layer are trained concurrently, simultaneously and/or as a single model. In some instances, the first set of layers are trained independently and/or separately from the at least one subject-specific layer.

A contextual operation controller 130 can use the predicted label to identify a device operation using one or more context rules (stored in a context-rule data store 135) or other approaches. Context rule(s) may identify each set of potential labels with a particular device operation. The context rule(s) may indicate that a particular device operation is to selectively be performed when a particular label is output. A non-rule-based approach may include (for example) using another machine learning model to predict a device operation that is likely to correspond with a target variable (e.g., low user stress, content satisfaction, etc.). The device operation can include (for example) presenting a notification, presenting a particular stimulus, presenting a particular type of stimulus, changing a stimulus presentation (e.g., changing a song being played), generating and transmitting a particular instruction communication (e.g., to a smart-home device), etc. For example, the device operation may indicate that a notification suggesting a break from the activity (or additional cognitive attention) is to be presented in response to detecting a given output. The device operation can be locally triggered, and/or an instruction communication to perform the device operation can be transmitted.

In some instances, all of the depicted components of FIG. 1 are included in a single computing system (e.g., an electronic device). In some instances, each of multiple computing systems include one or more of the depicted components. For example, a user device can include biosignal recorder 105, contextual operation controller 130 and context rules 135; and a remote computing system can include the remaining depicted components. The user device may then repeatedly transmit biosignals to the remote computing system, and the remote computing system can train the machine learning model using some of the biosignals. The remote computing system can further process another biosignal using the trained machine learning model to generate an output to transmit back to the user device, and the user device can use the output to identify a device operation.

In some instances, each of multiple computing systems includes an instance of a single component depicted in FIG. 1. For example, each of a user device and a remote computing system can include cross-subject ML model controller 110. At the remote computing system, cross-subject ML model controller 110 can train the cross-subject ML model using training data received from another set of user devices. The remote computing system's cross-subject ML model controller 110 can then transmit learned ML model parameters to the user device, and the parameters can be locally stored at cross-subject model parameter data store 115 at the user device. At the user device, cross-subject ML model controller 110 can then use the locally stored parameters (and locally stored subject-specific parameters) to process biosignals. Thus, the remote computing system can facilitate training the cross-subject ML model remotely using multiple users' data, but the communications of parameters can then enable the user device to completely locally use the trained model to process biosignals.

Figure 2:
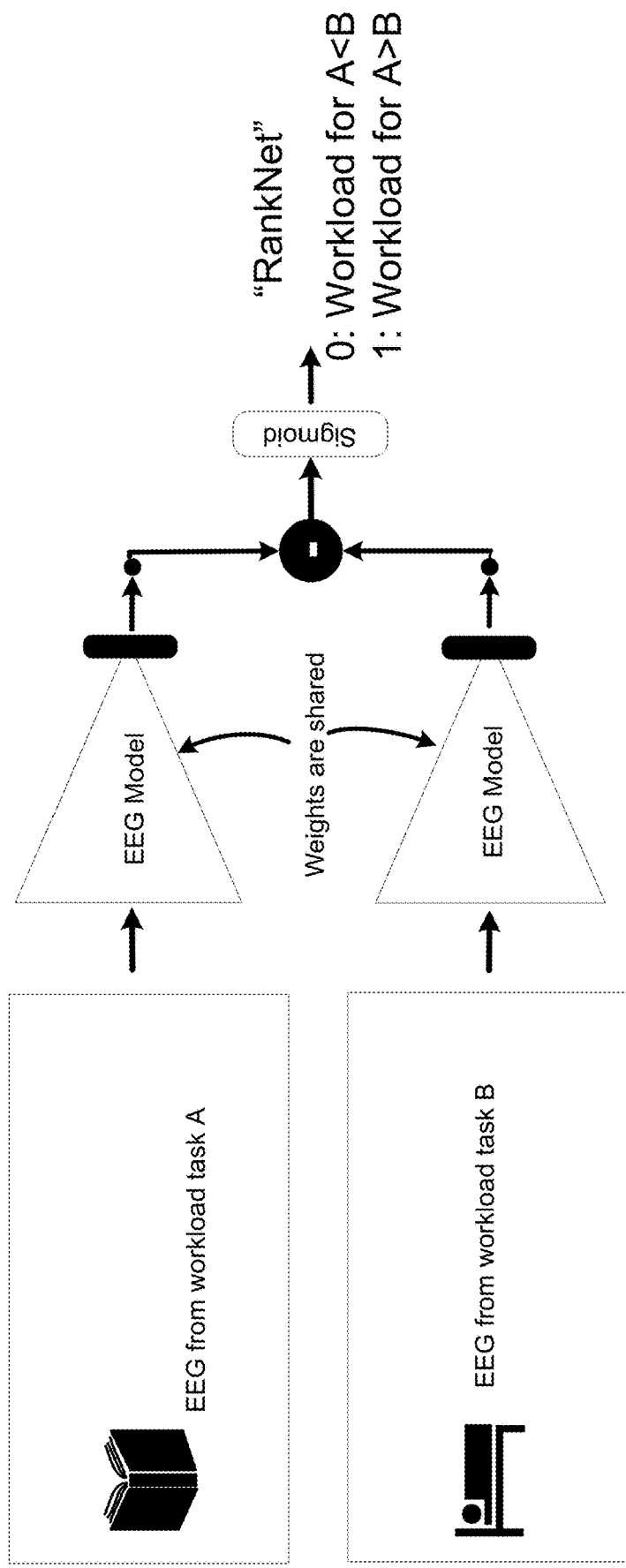
FIG. 2 illustrates an exemplary training of a machine learning model using EEG signals collected during two contexts.

FIG. 2 illustrates an exemplary training of a neural network using EEG signals collected during each of two contexts. In a first context, a subject is performing a cognitive task (e.g., reading). In a second context, the subject is relaxing. In each instance, the biosignal being recorded includes a multi-channel EEG signal across a period of time. Training data is to include a set of biosignals and also include corresponding label data to identify which, of the two contexts, corresponded to each recording. More specifically, a "0" label is used to indicate that a biosignal corresponded to the bottom-represented task B has a higher workload compared to task A, and a "1" label is used to indicate that a biosignal corresponded to the top-represented task A has a higher workload compared to task B. In this example, task A is a reading task with a higher workload compared to relaxing task B, and the final output has a "1" label.

In the depicted instance, the cross-subject ML sub-model and the subject-specific ML sub-model are trained to differentiate between the two contexts based on the EEG recordings. As part of the training, pairs of training data elements can be repeatedly selected that represent each of both contexts. The biosignal from each of the two training data elements can be processed using the cross-subject ML sub-model, such that a real value is produced for each biosignal. A delta value can be defined to equal the real value corresponding to a first of the two training data elements minus the real value from a second corresponding to a second of the two training data elements. The delta value can be input to a subject-specific sub-model (which, in the depicted instance is a sigmoid function) to generate a binary output that predicts whether a context of the first training data element was associated with a higher (or lower) workload as compared to a context of the second training data element. In some instances, parameters for the cross-subject ML sub-model and for the subject-specific sub-model are learned based on inter-training results of the pair-wise assessment. In some instances, parameters for the cross-subject ML sub-model are learned using a separate process (e.g., optimizing predictions for individual data-element biosignals instead of pair rankings), and parameters for the subject-specific sub-model are then learned using the pair-based approach and by incorporating the cross-subject ML sub-model configured with the previously learned parameters.

While two depictions of the cross-subject ML sub-model (shown as the "EEG Model") are included, it will be appreciated that these correspond to a single instance of the model. Thus, there is a single cross-subject ML sub-model that processes a biosignal. Advantageously, this training can facilitate learning parameters to generate a relative-score output that is generalizable. For example, rather than attempting to train using individual labeled biosignals to identify objective workload predictions, the pair-wise approach facilitates learning signal features that can distinguish between mental loads associated with harder or easier loads. The latter approach is not as sensitive to cross-user variation in absolute signal characteristics and/or task engagement, making the model faster to train, more accurate and more generalizable.

Figure 3:
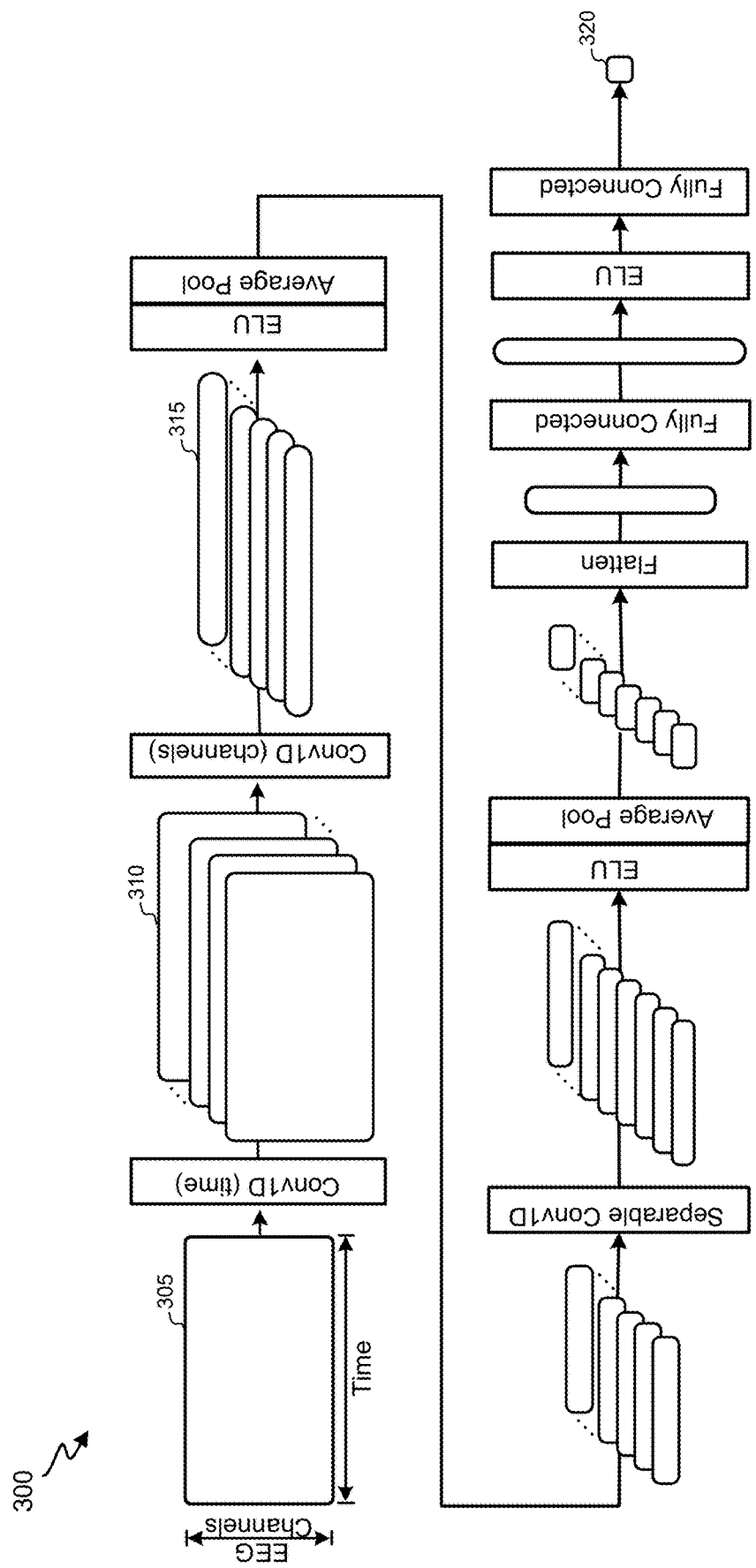
FIG. 3 illustrates an exemplary architecture of a machine learning model to process EEG signals according to some embodiments of the invention.

FIG. 3 illustrates an exemplary architecture of machine learning layers to process EEG signals according to some embodiments of the invention. The depicted architecture can correspond to architecture of the cross-subject ML sub-model.

An input can include a multi-channel EEG signal 305 that extends for a particular duration of time. A 1-dimensional convolutional layer can use one or more learned kernels to transform the input into a feature map 310. The initial 1-dimensional convolutional layer can be configured to detect temporal features, such that (for example) a feature detector covers all channels represented in the input. The initial 1-dimensional convolutional layer can use a kernel, having a size of (for example) (32, 1)×4. Feature map 310 can then be transformed, by another 1-dimensional convolutional layer (configured to detect cross-channel features) into another feature map 315. The other 1-dimensional convolutional layer can use another kernel to perform the data transformation, such as a kernel having a size of (for example) (1, #EEG channels)×8. In some instances, detection of temporal features can be performed prior to detecting cross-channel features.

Subsequent layers can include exponential linear unit (ELU) layers (to pass each positive input and apply an exponential non-linearity on any negative input), average pooling layers (to down-sample data), a flattening layer (to transform multi-dimensional data into a vector) and fully connected feedforward layers to facilitate transforming data into an output 320 of a target type (e.g., dimensionality and/or value type). In this instance, output 320 can be a real number.

Figure 4:
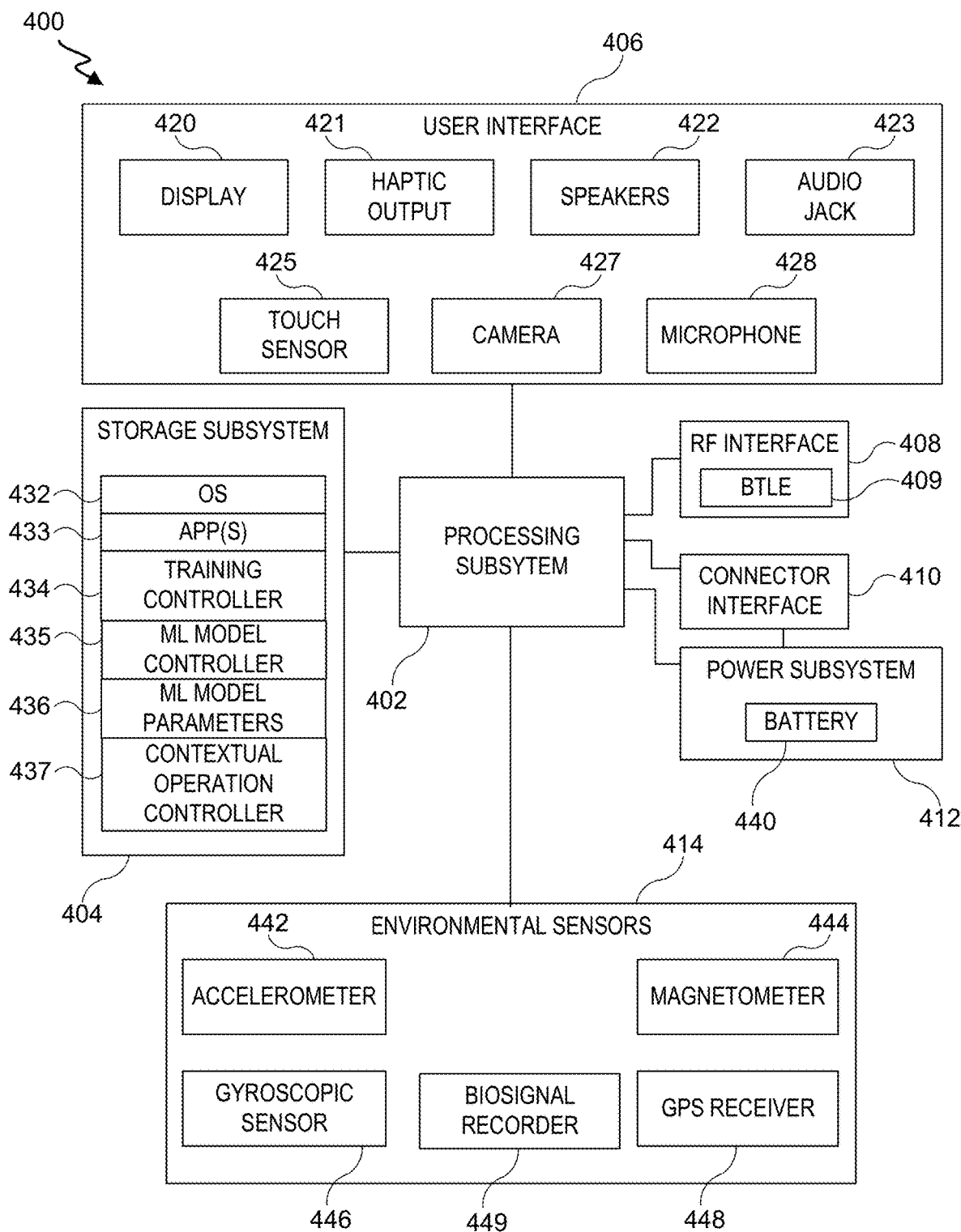
FIG. 4 is a simplified block diagram of an electronic device according to some embodiments of the present invention.

FIG. 4 is a simplified block diagram of an electronic device 400 according to some embodiments of the present invention. Device 400 can include (for example) a smart phone, wearable device, laptop, tablet, or desktop computer. Device 400 can include processing subsystem 402, storage subsystem 404, user interface 406, one or more connection components (e.g., RF interface 408 and/or connector interface 410), power subsystem 412, and environmental sensors 414. Device 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or nonvolatile media. In some embodiments, storage subsystem 404 can store media items such as audio files, video files, image or artwork files; information about a user's contacts (names, addresses, phone numbers, etc.); appointments and events; notes; and/or other types of information, examples of which are described below. In some embodiments, storage subsystem 404 can also store one or more application programs (or apps) 433 to be executed by processing subsystem 402 (e.g., video game programs, personal information management programs, media playback programs, interface programs associated with particular host devices and/or host device functionalities, etc.).

Storage subsystem 404 can include a training controller 434 that includes code configured to (when executed) pre-process training data and/or control training of all or part of the machine learning model to process biosignals to predict contexts. Training controller 434 may detect metadata that indicates, for each biosignal in a training data set, a characteristic of a context and/or which of a set of particular types of contexts corresponds to the biosignal. In some instances, training controller 434 can define a label for a given data element to identify a class based on context information associated with the data element. In some instances, training controller 434 selects multiple pairs of training data elements to use during all of part of training (e.g., using a pseudorandom or random selection process). Training controller 434 can then identify a target output for each pair based on context information associated with each data element in the pair. The target output can include an inequality or ranking that may indicate, for a given contextual variable, which data element in the pair was associated with a higher value for the contextual variable (or whether values for the contextual variable are the same for the pair). In some instances, training controller 434 strategically identifies pairs so as to avoid any pairs for which both data elements include a same value for the contextual variable.

An ML model controller 435 includes code configured to (when executed) use the training data to train a machine learning model. The machine learning model can include a first sub-model (e.g., including one or more convolutional layers) configured to receive a biosignal (or preprocessed version thereof) and output a real number representing a prediction as to whether the biosignal was collected in a particular type of context. The machine learning model can further include a second sub-model configured to receive multiple real-number prediction outputs corresponding to multiple biosignals and to output a prediction as to which of the multiple biosignals was associated with a context more extreme in a particular regard (e.g., being associated with a harder task, a more-preferred song, a more-stressed mental state, etc.).

In some instances, ML model controller 435 trains the first sub-model using unpaired data elements (e.g., and by implementing an objective function or penalty function that prioritizes correctly predicting a contextual class for individual biosignals). ML model controller 435 can then use the trained first sub-model to generate a real-number prediction output for each data element in each data-element pair selected by training controller 434. A difference between the real-number prediction outputs can be fed to the second sub-model. Training of the second sub-model can then be performed by (for example) introducing a penalty when the second sub-model inaccurately predicted which of the two biosignals was associated with a context associated with a high value of a given contextual variable. In some instances, parameters of the first sub-model are selectively learned in this pair-wise training (while parameters of the first sub-model can remain fixed at the values learned without using paired data elements). In some instances, parameters of the first sub-model and parameters of the second sub-model are learned during a same training process. Thus, parameters of the first sub-model may be learned using paired-data-element training data.)

Learned parameters for the first sub-model and learned parameters for the second sub-model can be stored in a ML-model parameter data store 436. While not shown, fixed hyperparameters and/or model-architecture data can further be stored at storage subsystem 404. In some instances, ML model controller 435 receives some or all of the learned parameters from a remote computing system and then stores the parameters in ML-model parameter data store 436. For example, a remote computing system may learn parameters for the first sub-model, and ML model controller 435 can use these parameters and additional training data (e.g., potentially including locally collected data) to learn parameters for the second sub-model.

ML model controller 435 can use the trained ML model (configured with the learned parameters) to then process one or more other (e.g., locally collected) biosignals. In some instances, each of the one or more other biosignals is transformed to a real-number prediction output using the first sub-model (configured with corresponding learned parameters). The trained second sub-model and potentially one or more baseline biosignals can be used to process the real-number prediction output to predict a context corresponding to the biosignal. For example, a learned parameter for the second sub-model may identify an upper delta threshold for predicting that two biosignals are associated with a same type of context. Thus, a difference between the real-number prediction output and baseline-associated real-number prediction output exceeds the upper delta threshold, it can predict that the two biosignals are from different types of contexts.

A contextual operation controller 437 can include code that, when executed, processes a model prediction for a given biosignal to identify an operation for performance at electronic device 400. The device operation can be identified using one or more rules. In some instances, contextual operation controller 437 may process a model prediction to determine whether to perform any of one or more types of device operations. A device operation that may be performed in response to a ML-model output for a biosignal can include (for example) presenting a notification that includes an instruction or recommendation; changing a song being played; changing a frequency of recording biosignals; and/or transmitting a communication to another device. Upon identifying a device operation to be performed, contextual operation controller 437 may trigger performance of the operation (e.g., by interacting with one or more other app(s) and/or one or more user-interface components).

User interface 406 can include any combination of input and output devices. A user can operate input devices of user interface 406 to invoke the functionality of device 400 and can view, hear, and/or otherwise experience output from device 400 via output devices of user interface 406. Examples of output devices include display 420, haptic output generator 421 and speakers 422. Display 420 can be implemented using compact display technologies, e.g., LCD (liquid crystal display), LED (light-emitting diode), OLED (organic light-emitting diode), or the like. In some embodiments, display 420 can incorporate a flexible display element or curved-glass display element, allowing device 400 to conform to a desired shape. One or more speakers 422 can be provided using small form-factor speaker technologies, including any technology capable of converting electronic signals into audible sound waves. In some embodiments, speakers 422 can be used to produce tones (e.g., beeping or ringing) and can but need not be capable of reproducing sounds such as speech or music with any particular degree of fidelity. Haptic output generator 421 can be, e.g., a device that converts electronic signals into vibrations; in some embodiments, the vibrations can be strong enough to be felt by a user wearing device 400 but not so strong as to produce distinct sounds.

Examples of input devices include touch sensor 425, camera 427 and microphone 428. An input device may be used to receive input indicative of a contextual variable to be used during training of a ML model. For example, an input may indicative whether and/or a degree to which a user likes a song being played (e.g., through speakers 422 or audio jack 423), feels tired, feels alert or feels happy. Touch sensor 425 can include, e.g., a capacitive sensor array with the ability to localize contacts to a particular point or region on the surface of the sensor and in some instances, the ability to distinguish multiple simultaneous contacts. In some embodiments, touch sensor 425 can be overlaid over display 420 to provide a touchscreen interface, and processing subsystem 404 can translate touch events (including taps and/or other gestures made with one or more contacts) into specific user inputs depending on what is currently displayed on display 420.

Camera 427 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 404 and/or transmitted by device 400 to other devices for storage. Depending on implementation, the optical components can provide fixed focal distance or variable focal distance; in the latter case, autofocus can be provided. In some embodiments, camera 427 can be disposed along an edge of a face member of a device, e.g., the top edge, and oriented to allow a user to capture images of nearby objects in the environment such as a bar code or QR code. In other embodiments, camera 427 can be disposed on the front surface of a device face member, e.g., to capture images of the user. Zero, one, or more cameras can be provided, depending on implementation.

Microphone 428 can include any device that converts sound waves into electronic signals. In some embodiments, microphone 428 can be sufficiently sensitive to provide a representation of specific words spoken by a user; in other embodiments, microphone 428 can be usable to provide indications of general ambient sound levels without necessarily providing a high-quality electronic representation of specific sounds.

In some embodiments, user interface 406 can provide output to and/or receive input from an auxiliary device such as a headset. For example, audio jack 423 can connect via an audio cable (e.g., a standard 2.5 mm or 3.5 mm audio cable) to an auxiliary device. Audio jack 423 can include input and/or output paths. Accordingly, audio jack 423 can provide audio to the auxiliary device and/or receive audio from the auxiliary device. In some embodiments, a wireless connection interface can be used to communicate with an auxiliary device.

Processing subsystem 402 can be implemented as one or more integrated circuits, e.g., one or more single-core or multi-core microprocessors or microcontrollers, examples of which are known in the art. In operation, processing subsystem 402 can control the operation of device 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for device 400. For example, in some embodiments, processing subsystem 402 can execute an operating system (OS) 432 and various applications 433 such as a phone-interface application, a text-message interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to device 400. For example, if device 400 has a local media library stored in storage subsystem 404, a media interface application can provide a user interface to select and play locally stored media items.

Processing subsystem 402 can also execute a code for one or more components of device 400. For example, processing subsystem 402 can execute a code for training controller 434, ML model controller 435 and/or contextual operation controller 437.

RF (radio frequency) interface 408 can allow device 400 to communicate wirelessly with various devices. RF interface 408 can include RF transceiver components such as an antenna and supporting circuitry to enable data communication over a wireless medium, e.g., using WiFi (IEEE 802.11 family standards), Bluetooth® (a family of standards promulgated by Bluetooth SIG, Inc.), or other protocols for wireless data communication. In some embodiments, RF interface 408 can implement a Bluetooth LE (Low energy) proximity sensor 409 that supports proximity detection through an estimation of signal strength and/or other protocols for determining proximity to another electronic device.

In some embodiments, RF interface 408 can provide nearfield communication ("NFC") capability, e.g., implementing the ISO/IEC 18092 standards or the like; NFC can support wireless data exchange between devices over a very short range (e.g., 20 centimeters or less). RF interface 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 408.

Connector interface 410 can allow device 400 to communicate with various devices (e.g., a server or coordinating device) via a wired communication path, e.g., using Universal Serial Bus (USB), universal asynchronous receiver/transmitter (UART), or other protocols for wired data communication. In some embodiments, connector interface 410 can provide a power port, allowing device 400 to receive power, e.g., to charge an internal battery. For example, connector interface 410 can include a connector such as a mini USB connector or a custom connector, as well as supporting circuitry. In some embodiments, a device can be powered or charged via inductive charging. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

In some embodiments, connector interface 410 and/or RF interface 408 can be used to support synchronization operations in which data is transferred from a another device to device 400 (or vice versa). For example, a user can be able to customize settings and other information for device 400. While user interface 406 can support data-entry operations, a user can find it more convenient to define customized information on a separate device (e.g., a tablet or smartphone) that has a larger interface (e.g., including a real or virtual alphanumeric keyboard), then transfer the customized information to device 400 via a synchronization operation. Synchronization operations can also be used to load and/or update other types of data in storage subsystem 404, such as media items, application programs, personal data, and/or operating system programs. Synchronization operations can be performed in response to an explicit user request and/or automatically, e.g., when device 400 resumes communication with a particular host device or in response to either device receiving an update to its copy of synchronized information.

Environmental sensors 414 can include various electronic, mechanical, electromechanical, optical, or other devices that provide information related to external conditions around device 400. Sensors 414 in some embodiments can provide digital signals to processing subsystem 402, e.g., on a streaming basis or in response to polling by processing subsystem 402 as desired. Any type and combination of environmental sensors can be used; shown by way of example are accelerometer 442, a magnetometer 444, a gyroscope 446, a GPS receiver 448 and a biosignal recorder 449.

Some environmental sensors can provide information about the location and/or motion of device 400. For example, accelerometer 442 can sense acceleration (relative to freefall) along one or more axes, e.g., using piezoelectric or other components in conjunction with associated electronics to produce a signal. Magnetometer 444 can sense an ambient magnetic field (e.g., Earth's magnetic field) and generate a corresponding electrical signal, which can be interpreted as a compass direction. Gyroscopic sensor 446 can sense rotational motion in one or more directions, e.g., using one or more MEMS (microelectromechanical systems) gyroscopes and related control and sensing circuitry. Global Positioning System (GPS) receiver 448 can determine location based on signals received from GPS satellites. In some instances, data detected from one or more environmental sensors can be used to identify a gesture indicative of particular input. For example, rather than using a touchscreen to select a notification action and/or dismiss an alert or notification, this information can be conveyed by a particular arm movement.

Biosignal recorder 449 may include a component that is fixed and integrated into electronic device 400 or an accessory that is connected to electronic device 400. Biosignal recorder 449 can be configured to record biosignals from a user or other subject. Biosignal recorder 449 may include one or more electrodes (or other components) configured to be positioned on and/or secured to a particular part of a user (e.g., on a user's head).

Other sensors can also be included in addition to or instead of these examples. For example, a sound sensor can incorporate microphone 428 together with associated circuitry and/or program code to determine, e.g., a decibel level of ambient sound. Temperature sensors, proximity sensors, ambient light sensors, or the like can also be included.

Power subsystem 412 can provide power and power management capabilities for device 400. For example, power subsystem 412 can include a battery 440 (e.g., a rechargeable battery) and associated circuitry to distribute power from battery 440 to other components of device 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

In some embodiments, power subsystem 412 can control power distribution to components within device 400 to manage power consumption efficiently. For example, power subsystem 412 can automatically place device 400 into a hibernation state (e.g., locked configuration) upon receiving a signal from device-lock control 434 to make the transition and/or indicating that no input activity has been detected for at least a predefined period of time. The hibernation state can be designed to reduce power consumption; accordingly, user interface 406 (or components thereof), RF interface 408, connector interface 410, and/or environmental sensors 414 can be powered down (e.g., to a low-power state or turned off entirely), while other sensors can be powered up (either continuously or at intervals) to detect when a user puts on or uses a device.

Power subsystem 412 can also provide other power management capabilities, such as regulating power consumption of other components of device 400 based on the source and amount of available power, monitoring stored power in battery 440, generating user alerts if the stored power drops below a minimum level, and so on.

In some embodiments, control functions of power subsystem 412 can be implemented using programmable or controllable circuits operating in response to control signals generated by processing subsystem 402 in response to program code executing thereon (e.g., of device-lock control 434), or as a separate microprocessor or microcontroller. In some embodiments, control functions of power subsystem 412 can be based on user interaction with the device (e.g., to power down components if a device has not been interacted with in a particular manner, such as via a touch, button press or network activity, for a defined period of time).

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the device has an RF interface, a connector interface can be omitted, and all communication between the device and other devices can be conducted using wireless communication protocols. A wired power connection, e.g., for charging a battery of the device, can be provided separately from any data connection.

Further, while the device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of a device.

Figure 5:
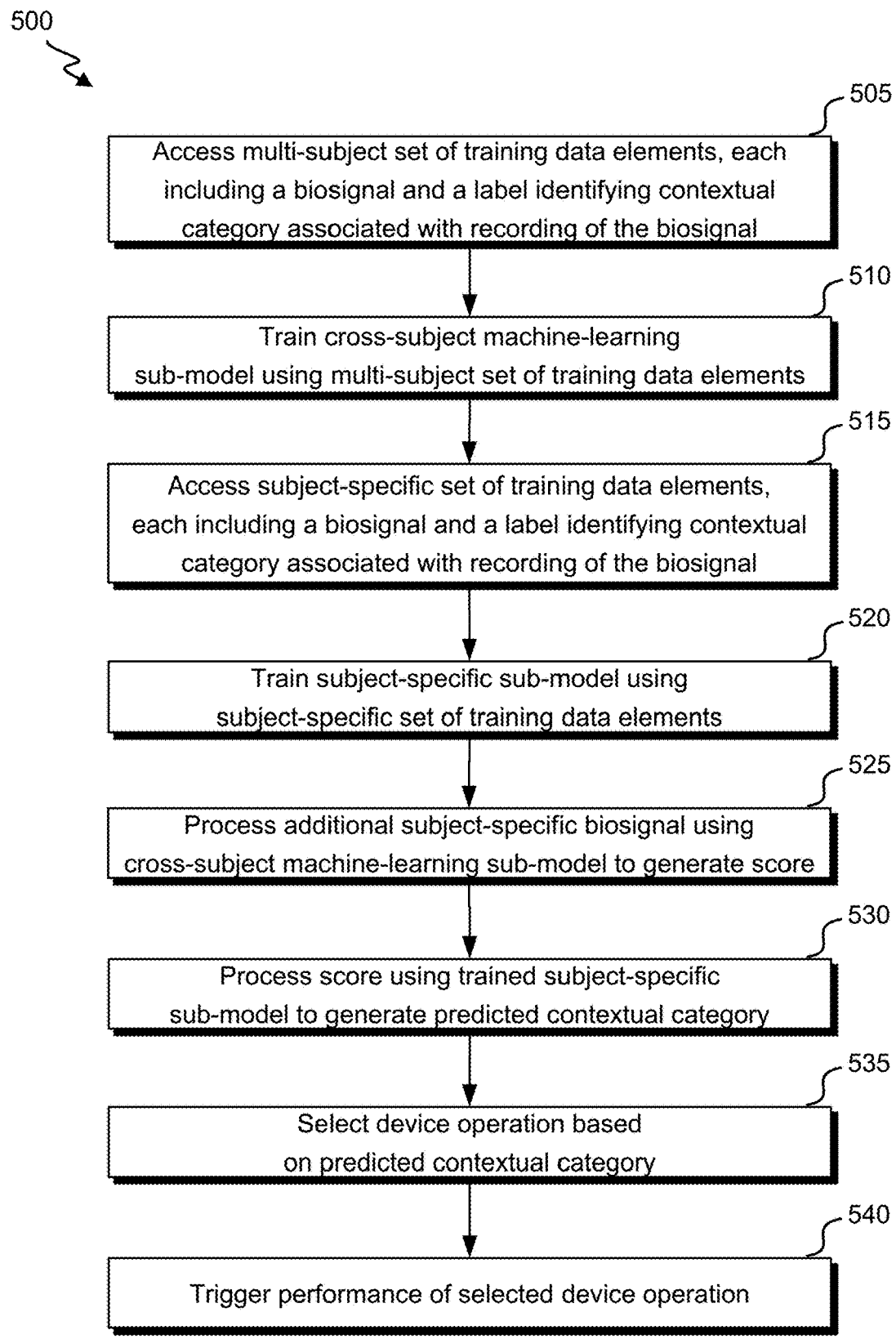
FIG. 5 is a flow diagram of a process for processing biosignals according to some embodiments of the present invention.
Figure 6:
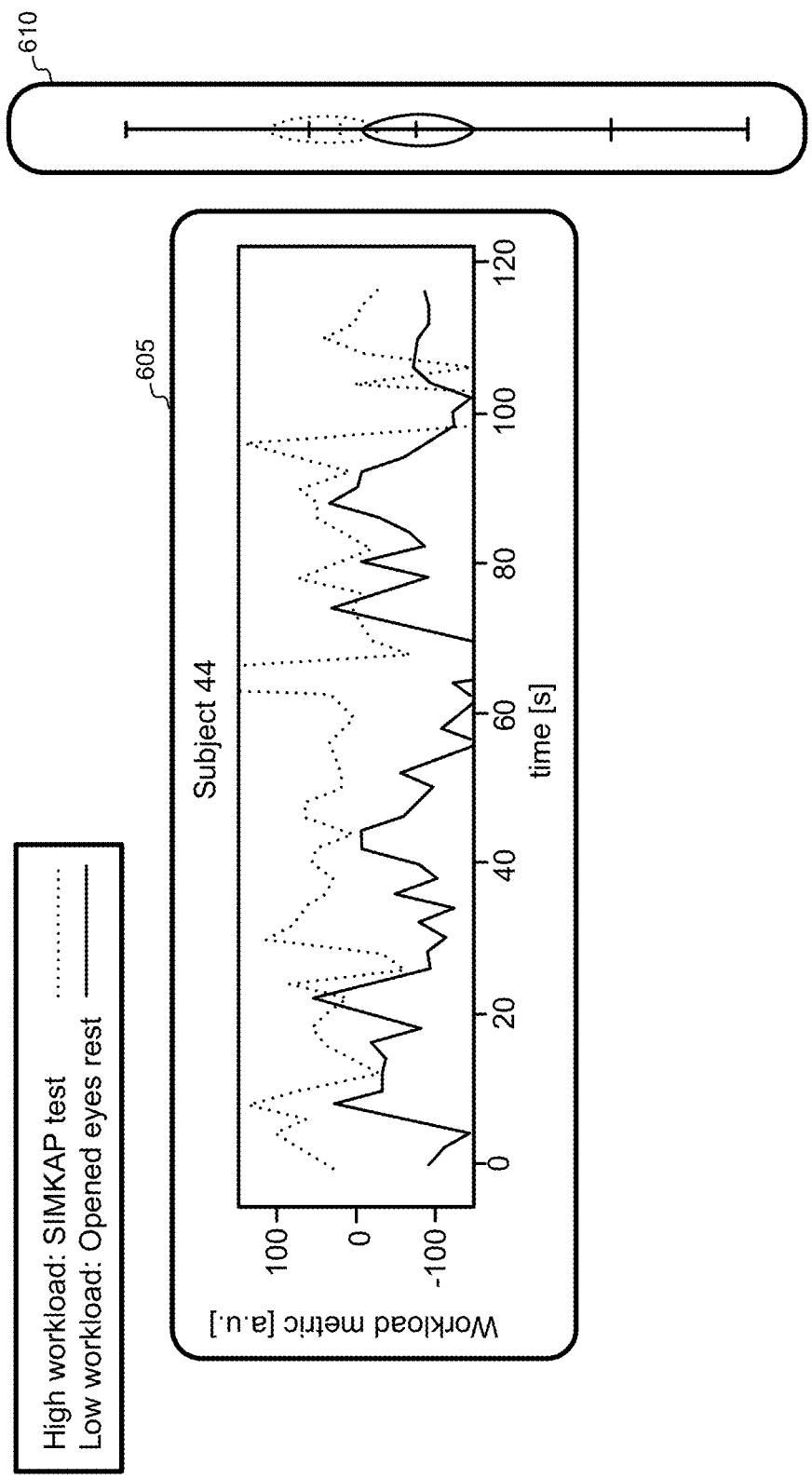
FIG. 6 shows exemplary outputs from a binary classifier model processing biosignals.

FIG. 5 is a flow diagram of a process 500 for processing biosignals according to some embodiments of the present invention. At block 505, a multi-subject set of training data elements can be accessed. Each data element of the multi-subject set can include a biosignal (which may be a preprocessed version of a raw biosignal) and a label identifying a contextual category associated with recording the biosignal. The contextual category may have been identified based on (for example) a stimulus (e.g., a task-presentation stimulus) presented at a device corresponding to a biosignal recording at a time of the recording or an input received at a device (e.g., identifying a rating of content or a user self-assessment) corresponding to a biosignal recording at a time associated with the recording. The contextual category may be one of a set of predefined categories. Each of the set of predefined categories may pertain to a particular characteristic of a context (e.g., "High mental attention" and "Low mental attention"). At block 510, a cross-subject machine learning sub-model can be trained using the multi-subject set of training data elements.

At block 515, a subject-specific set of training data elements. Each data element in the subject-specific set of training data elements may include the same type of data as included in the multi-subject set of training data elements. Each data element in the subject-specific set of training data elements can include a biosignal and a label identifying a contextual category associated with the recording of the biosignal. Each biosignal in the subject-specific set of training data elements may have been recorded from a particular subject. In some instances, the multi-subject set of training data elements include biosignals recorded from a set of users that does not include the particular user.

At block 520, a subject-specific machine learning sub-model can be trained using the subject-specific set of training data elements. In some instances, parameters of the cross-subject machine learning sub-model can be further modified at block 520 (such that block 520 relates to a training of both the subject-specific machine learning sub-model and of the cross-subject machine learning sub-model). In some instances, parameters of the cross-subject machine learning sub-model are fixed and not learned during the training of block 520.

At block 525, an additional subject-specific biosignal can be processed using the trained cross-subject machine learning sub-model to generate a score. The score can be a numeric real number.

At block 530, the score is processed using the trained subject-specific machine learning sub-model to generate a predicted contextual category. The predicted contextual category can correspond to a prediction as to in what type of context the additional subject-specific biosignal was collected.

At block 535, a device operation is selected based on the predicted contextual category. The device operation can include a presentation of a particular notification or a particular type of notification. The device operation can include changing, initiating or stopping presentation of particular music, video or image content. The device operation can be selected based on one or more static or learned rules.

At block 540, performance of the selected device operation can be triggered and/or performed. The device operation may be one that is performed at a device associated with the particular subject. In some instances, triggering the device operation includes transmitting a communication to another device with an instruction that corresponds to the instruction to perform the operation or with a request for data to enable the device operation.

EXAMPLES

Example 1

EEG biosignals were collected from each of 48 male students. The biosignals were collected using an Emotiv EPOC EEG (14ch, 128 Hz. The biosignals were collected during each of two contexts. In a first context, the subject was resting with eyes opened. In a second context, the subject was performing a SIMKAP test (simultaneous capacity, Schulhfried GmbH) for 18 minutes. The SIMKAP test is designed to require a subject to multi-task. Specifically, a top part of a screen shows two matrices, and the subject is to mark off numbers shown in both matrices. Meanwhile, the subject is also expected to complete other tasks being shown at the bottom of the screen. Each biosignal was measured over 3 minutes.

Each biosignal version is associated with a label indicating whether it was collected during the first (low-workload) context or during the second (high-workload) context. Labeled biosignals for 38 subjects were used for training, and labeled biosignals for 10 subjects were used for testing.

Multiple versions of each biosignal were generated by keeping only a fraction of the channels' data. Specifically, multiple versions of each 14-channel biosignal was generated, where each version kept only 6 of the channels. This channel-dropping approach can reduce a likelihood of overfitting on specific channel configurations, which can facilitate training that uses information from a larger number of the channels and that reduces a model's reliance on very specific electrode placement.

For each subject-context-version combination, the channel-filtered biosignal was discretized in the time domain into a set of time bins. Each binned portion was input to a cross-subject machine learning sub-model having an architecture as depicted in FIG. 3. The cross-subject machine learning sub-model generated a numeric real-value score for each biosignal. Plot 605 shows, for a particular subject in the test set, scores generated for each time bin and for each context. For this particular subject, scores for the high-workload context were generally—but not always—greater than zero, and scores for the low-workload context were generally—but not always—less than zero. A distribution of the scores was generated for each subject-context-version combination. Plot 610 shows the distributions for the depicted version and for Subject 44. Generally, scores were higher for the high-workload context as compared to the low-workload context, though the distributions did overlap.

Figure 7:
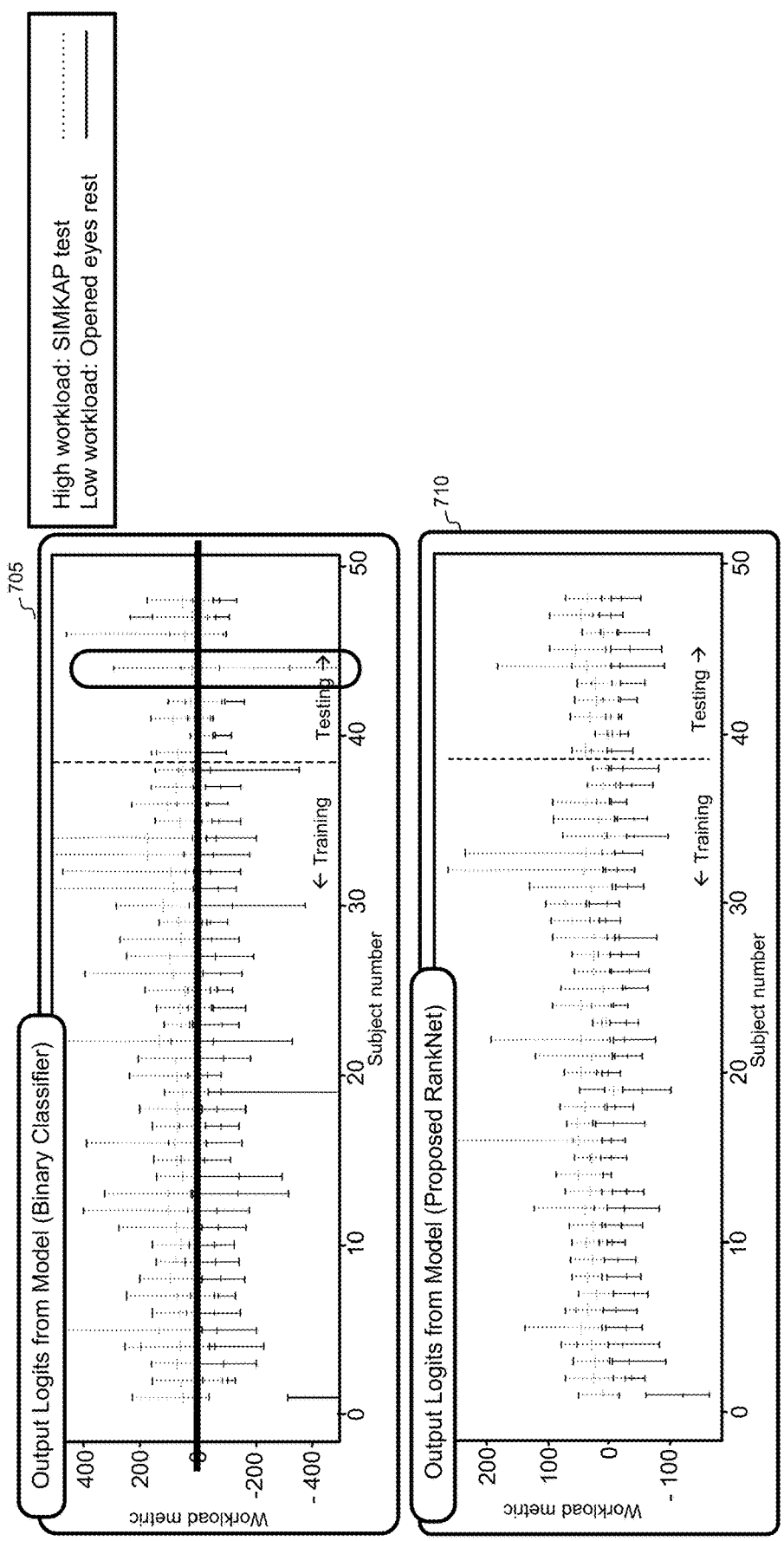
FIG. 7 compares exemplary outputs from the binary classifier model to exemplary outputs from a rank based classifier neural network model.

Plot 705 in FIG. 7 shows the distributions for a given version (having a single channel drop-out implemented) across subjects and for each context. The plot further includes a y=0 line, which can represent a threshold that would correspond to a classification that would be made solely based on the cross-subject machine learning sub-model. Notably, the degree to which this threshold reliably distinguishes scores across the two contexts' scores varies across subjects. For example, for Subject 40, the distributions suggest that threshold would result in misclassifying many of the high-workload signals.

To investigate an extent to which an additional subject-specific sub-model would affect performance, parameters for a subject-specific sub-model (that included a sigmoid-fitting model) were learned for each subject. Specifically, multiple data pairs were identified, each pair including one high-workload biosignal segment and also to one low-workload biosignal segment. The subject-specific machine learning sub-model was trained to detect which segment corresponded to the high-workload context. The subject-specific machine learning sub-model was configured so as to transform each score into a modified score, and a threshold of zero was then used to assess classification. Plot 710 in FIG. 7 shows distributions of the modified scores. In general, the distributions indicate that the modified scores for the high-workload context were reliably higher than the modified scores for the low-workload context.

The classification accuracy for the original scores was 82%, while the classification accuracy for the modified scores was 87%. Here, data from 38 subjects were used for training, and data from 10 other subjects were used for testing.

An additional analysis was performed where the initial cross-subject machine learning model was trained using subject-specific data (to produce subject-specific trained set of first layers) as opposed to using data from multiple subjects. For each subject, 80% of the signals were used for training and 20% for testing. For this intra-subject approach, the classification accuracy for the original scores was 89%, while the classification accuracy for the modified scores was 92%.

Figure 8:
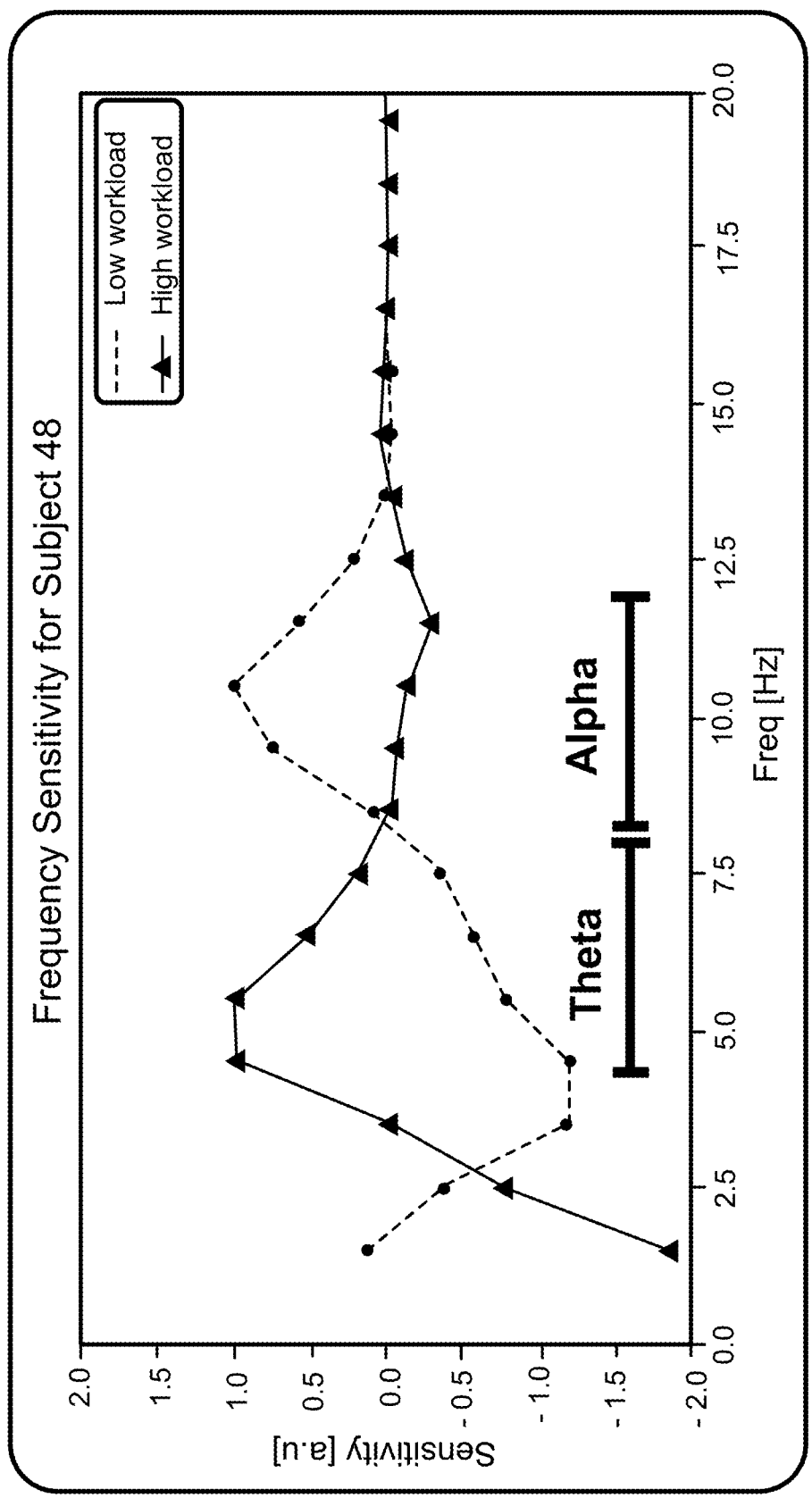
FIG. 8 illustrates frequency sensitivity curves generated by convolving biosignals collected from a particular subject during two workloads using trained convolutional layers.

A sensitivity analysis was also performed using the subject-specific trained set of first layers to determine whether domain knowledge could be verified. FIG. 8 shows frequency-base sensitivity curves for a particular subject and each context. The sensitivity curves were generated by iteratively removing particular frequency bands from signals and quantifying an impact on classification accuracy. When theta-band signal components (brain activity in the 4-7 Hz frequency range) were removed, the classifier began to increase low-workload classification prevalence. This sensitivity is consistent with theta bands originating from the hippocampus region being associated with working memory. Meanwhile, when alpha-band signal (brain activity in the 8-12 Hz frequency range) components were removed, the classifier began to increase high-workload classification prevalence. This sensitivity is consistent with alpha bands being associated with relaxation.

Example 2

EEG signals are recorded from each subject of a set of subjects while the subject is listening to music. A training set is defined to include a subset of the recorded EEGs and corresponding subject feedback as to whether the subject liked the song. The feedback was binary so as to either indicate that the subject liked the song or not. A machine learning model (that includes an initial score-generating model and a pair-assessing activation-function layer, similar to the model depicted in FIG. 2) is trained by pairing data elements and generating an output indicative which (if either) of the EEG signals represented in the pair corresponded to more positive feedback.

For a non-training EEG signal, the signal is paired (shortly or immediately after it is collected) to a baseline signal corresponding to negative feedback for a song. The signal pair is processed using the trained model to predict whether the subject liked a song being played while the testing EEG signal was collected or not. If it is predicted that the subject does not like the song, the song can be skipped to progress to a next song.

Example 3

EEG signals are recorded from each subject of a set of subjects while the subject is listening to music being played by a music app. An event stream is also generated that identifies when each of a play, stop or next control of the app is selected via input corresponding to the subject and same time period. A machine learning model having a structure disclosed herein is trained to classify signals to predict a corresponding command. EEG signals can then be processed using the trained model to predict what control is desired by a user and to automatically implement the control.

Example 4

An app is installed on a user device that is configured to receive EEG signals collected using one or more connected sensors, to predict to which of multiple contexts the EEG signals correspond, and to control a device operation based on the predicted context. An initial processing pipeline is predefined to include a model previously trained at a central server using data associated with multiple other users. The model is configured to receive EEG signals, generate (using a first sub-model of the model) a real-value output corresponding to a predicted probability that the signals correspond to a particular context, and predict (using a second sub-model) a context based on the real-value output. The user device controls stimulus presentations based on the predicted context, and the user device further tracks the extent to which individual stimulus presentations are rejected by the user (e.g., by closing a presentation within a predefined period of time or providing an input that explicitly rejects the output). Instances during which the individual stimulus presentations are not rejected are identified as corresponding to accepted or appropriate presentations.

The app uses this rejection/acceptance data to train the second sub-model that predicts contexts based on the real-value outputs. Thus, a set of user-specific parameters are learned for the portion of the model. A first accuracy metric is generated using at least part of the rejection/acceptance data and the initially configured second sub-model. A second accuracy metric is generated using at least part of the rejection/acceptance data and the user-specific configured second sub-model. When the second accuracy metric exceeds the first accuracy metric, the second sub-model is updated such that the user-specific parameters replace the initial parameters. Thus, the initial configuration of the model facilitates immediate use of the context-dependent device configurations, but the user-specific training then improves the overall performance and utility of the app for the particular user.

Disclosed techniques that use rank-based training (e.g., that learn to detect relative context attributes) provide a variety of advantages as compared to techniques trained to predict absolute metrics. For example, rank-based training can result in more accurate predictions and can facilitate using a base model trained using a diverse (e.g., multi-subject) data set for a more focused use case. For example, an initial classifier can be trained with a large and diverse data set, while another layer that performs the pair-based analysis can be trained with more focused data of a type expected in a use case. This can facilitate targeted training even when there is insufficient data to accurately train a complete processing pipeline.

While various disclosures herein indicate that particular data sets, components, training, processing and/or uses may be subject-specific, it will be appreciated that other types of specificity can alternatively or additionally be applied. For example, part or all of a model may be trained using data that corresponds to subjects for which a particular hemisphere of their brain is dominant, that corresponds to particular levels of environmental noise, or that corresponds to inferred or known positioning data indicating positions of electrodes. As another example, biosignals can include Galvanic-skin-response signals, temperature signals or fMRI signals instead of EEG signals.

As described above, one aspect of the present technology is the gathering and use of data available from various sources (e.g., users' phones) to predict contextual characteristics based on biosignals. Further user inputs and/or stored data may be used to train a model to predict the contextual characteristics based on biosignals. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to trigger a device operation as a result of predicting a contextual characteristic using a biosignal. As another example, the personal information data can be pooled across users to facilitate training at least part of a machine learning model (that transforms biosignals into contextual-characteristic predictions), such that the model can be used even if little or no user-specific biosignal data is yet available.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using biosignals for machine learning model training and/or to predict and act on a contextual characteristic, the present technology can be configured to allow users to select to "opt in" or "opt out" of participation in the collection of personal information data during registration for services or anytime thereafter. In another example, users can select not to allow transmissions to be sent to other devices identifying a predicted contextual characteristic and/or not to allow predicted contextual characteristics to be locally or remotely stored. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a machine learning model controller can be configured to operate sufficiently or entirely locally on a device such that a user's biosignals are not transmitted to another device. As another example, techniques may operate based on a non-biological signal as opposed to a biosignal. For example, a type of signal fed to a machine learning model can include device-usage, acceleration and/or temperature data collected at a device that is not tied to personally identifiable information.

The present description may make reference to specific examples of a user device, such as a device. It is to be understood that these examples are illustrative and not limiting; other devices can be substituted and can implement similar functional blocks and/or algorithms to perform operations described herein and/or other operations. In some instances, a user device can be non-wearable and/or non-mobile.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
    accessing a particular biosignal corresponding to a particular subject;
    processing the particular biosignal using a machine learning model to generate a particular categorical output, the machine learning model having been trained at least in part to predict comparative results indicating which of multiple data elements is associated with a higher amount of a particular contextual characteristic, the machine learning model having been trained using a set of training data elements, each training data element of the set of training data elements including:
        a biosignal; and
        a contextual-category label characterizing the particular contextual characteristic in a context associated with recording of the biosignal, the contextual-category label identifying a contextual category of a set of predefined contextual categories, the set of predefined contextual categories including the particular categorical output;
    selecting a device operation based on the particular categorical output; and
    triggering the selected device operation to be performed at a user device.

2. The computer-implemented method of claim 1, wherein:
    the machine learning model includes:
        a first set of layers trained to receive an individual biosignal and output an interim numeric value for the individual biosignal; and
        at least one second layer configured to receive a difference metric based on interim numeric values from two or more individual biosignals and to output a comparative result; and
    the particular categorical output is generated by:
        using the first set of layers to generate a particular interim numeric value for the particular biosignal;
        generating a particular difference metric based on the particular interim numeric value and a baseline interim numeric value corresponding to a baseline biosignal;
        using the at least one second layer to generate a particular comparative result based on the particular difference metric; and
        determining the particular categorical output using the particular comparative result.

3. The computer-implemented method of claim 1, wherein:
    the set of training data elements includes:
        a subject-specific plurality of training data elements, each training data element of the plurality of the subject-specific plurality of training data elements being associated with the particular subject; and
        a cross-subject plurality of training data elements associated with a set of other subjects; and
    the machine learning model includes:
        a first set of layers trained using the cross-subject plurality of training data elements; and
        at least one second layer trained using the subject-specific plurality of training data elements, the machine learning model being configured such that an output from the first set of layers is received as input to the at least one second layer.

4. The computer-implemented method of claim 3, wherein processing the particular biosignal includes:
    generating an interim numeric value using the particular biosignal and the first set of layers, the interim numeric value having been identified from among a bounded or unbounded continuum of values; and
    processing the interim numeric value using the at least one second layer to generate the particular categorical output.

5. The computer-implemented method of claim 2, wherein a portion of the model includes one or more network layers such as fully-connected layers or convolutional layers.

6. The computer-implemented method of claim 2, wherein:
    the model was trained at a computing system remote from the user device;
    the selection of the device operation is performed at the user device; and
    the triggering of the device operation is performed at the user device.

7. The computer-implemented method of claim 1, wherein the particular biosignal includes an EEG signal and/or a fNIRS signal.

8. The computer-implemented method of claim 1, wherein:
    selecting the device operation includes determining to present a particular notification; and
    triggering the selected device operation includes causing the particular notification to be presented at a user device associated with the particular subject.

9. The computer-implemented method of claim 1, wherein the set of predefined contextual categories includes two categories.

10. The computer-implemented method of claim 1, wherein each of the set of predefined contextual categories corresponds to a different workload or different level of user satisfaction with a stimulus being presented at the user device.

11. A computing system comprising:
    one or more processors; and
    a computer-readable storage medium containing instructions, that, when executed by the one or more processors, cause the one or more processors to perform actions including:
        accessing a particular biosignal corresponding to a particular subject;

processing the particular biosignal using a machine learning model to generate a particular categorical output, the machine learning model having been trained at least in part to predict comparative results indicating which of multiple data elements is associated with a higher amount of a particular contextual characteristic, the machine learning model having been trained using a set of training data elements, each training data element of the set of training data elements including:
- a biosignal; and
- a contextual-category label characterizing the particular contextual characteristic in a context associated with recording of the biosignal, the contextual-category label identifying a contextual category of a set of predefined contextual categories, the set of predefined contextual categories including the particular categorical output;

selecting a device operation based on the particular categorical output; and triggering the selected device operation to be performed at a user device.

12. The computing system of claim 11, wherein:
the machine learning model includes:
- a first set of layers trained to receive an individual biosignal and output an interim numeric value for the individual biosignal; and
- at least one second layer configured to receive a difference metric based on interim numeric values from two or more individual biosignals and to output a comparative result; and the particular categorical output is generated by:
- using the first set of layers to generate a particular interim numeric value for the particular biosignal;
- generating a particular difference metric based on the particular interim numeric value and a baseline interim numeric value corresponding to a baseline biosignal;
- using the at least one second layer to generate a particular comparative result based on the particular difference metric; and
- determining the particular categorical output using the particular comparative result.

13. The computing system of claim 11, wherein:
the set of training data elements includes:
- a subject-specific plurality of training data elements, each training data element of the plurality of the subject-specific plurality of training data elements being associated with the particular subject; and
- a cross-subject plurality of training data elements associated with a set of other subjects; and the machine learning model includes:
- a first set of layers trained using the cross-subject plurality of training data elements; and
- at least one second layer trained using the subject-specific plurality of training data elements, the machine learning model being configured such that an output from the first set of layers is received as input to the at least one second layer.

14. The computing system of claim 13, wherein processing the particular biosignal includes:

generating an interim numeric value using the particular biosignal and the first set of layers, the interim numeric value having been identified from among a bounded or unbounded continuum of values; and processing the interim numeric value using the at least one second layer to generate the particular categorical output.

15. The computing system of claim 12, wherein the first set of layers include one or more convolutional layers.

16. The computing system of claim 12, wherein:
the first set of layers were trained at a computing system remote from the user device;
the processing of the particular biosignal is performed at the user device;
the selection of the device operation is performed at the user device; and
the triggering of the device operation is performed at the user device.

17. The computing system of claim 11, wherein the particular biosignal includes an EEG signal.

18. The computing system of claim 11, wherein:
selecting the device operation includes determining to present a particular notification; and
triggering the selected device operation includes causing the particular notification to be presented at a user device associated with the particular subject.

19. The computing system of claim 11, wherein the set of predefined contextual categories includes two categories.

20. The computing system of claim 11, wherein each of the set of predefined contextual categories corresponds to a different workload or different level of user satisfaction with a stimulus being presented at the user device.

21. A computer-program product tangibly embodied in a non-transitory machine-readable storage medium, including instructions configured to cause one or more data processors to perform a set of actions including:
accessing a particular biosignal corresponding to a particular subject;
processing the particular biosignal using a machine learning model to generate a particular categorical output, the machine learning model having been trained at least in part to predict comparative results indicating which of multiple data elements is associated with a higher amount of a particular contextual characteristic, the machine learning model having been trained using a set of training data elements, each training data element of the set of training data elements including:
- a biosignal; and
- a contextual-category label characterizing the particular contextual characteristic in a context associated with recording of the biosignal, the contextual-category label identifying a contextual category of a set of predefined contextual categories, the set of predefined contextual categories including the particular categorical output;

selecting a device operation based on the particular categorical output; and triggering the selected device operation to be performed at a user device.

* * * * *